United States Patent [19]
Bruhn

[11] Patent Number: 5,326,235
[45] Date of Patent: Jul. 5, 1994

[54] ELECTRIC MOTOR WITH ATTACHED PUMP

[75] Inventor: Rainer Bruhn, Karlsruhe, Fed. Rep. of Germany

[73] Assignee: SWF Auto-Electric GmbH, Bietigheim-Bissingen, Fed. Rep. of Germany

[21] Appl. No.: 937,844
[22] PCT Filed: Dec. 2, 1991
[86] PCT No.: PCT/EP91/02272
 § 371 Date: Dec. 7, 1992
 § 102(e) Date: Dec. 7, 1992
[87] PCT Pub. No.: WO92/14927
 PCT Pub. Date: Sep. 3, 1992

[30] Foreign Application Priority Data

Feb. 21, 1991 [DE] Fed. Rep. of Germany ....... 4105349

[51] Int. Cl.⁵ .................................. F04B 35/04
[52] U.S. Cl. .................................. 417/410 R; 310/89
[58] Field of Search ............. 417/410 R, 423.1, 423.6, 417/423.15; 310/89

[56] References Cited

U.S. PATENT DOCUMENTS 3,311,293  3/1967  Moffatt ........................ 417/410 R
4,866,322  9/1989  Baumeister et al. .................. 310/89
5,124,602  6/1992  Nishimura et al. .................. 310/89
5,237,231  8/1993  Blaettner et al. ...................... 310/89

FOREIGN PATENT DOCUMENTS 2644520  9/1990  France .

OTHER PUBLICATIONS

Abstract of Japanese Patent No. 57068590 Date: Apr. 1982.
Abstract of Japanese Patent No. 61023890 Date: Feb. 1986.

Primary Examiner—Richard A. Bertsch
Assistant Examiner—Peter Korytnyk
Attorney, Agent, or Firm—Robert P. Seitter; J. Gordon Lewis

[57] ABSTRACT

In order to connect a pump (1) with an electric motor (2) quickly and form-fittingly, a hollow, tappet-shaped stud (6) is formed onto the pot-shaped motor housing (7), specifically onto the bottom of the pot (10). The stud engages an insertion recess (5) of the pump. A driving eccentric (4) of the driven shaft (3) is connected with the pump during the assembly of the pump. If the inside of the tappet-shaped stud (6) is to receive the first motor bearing, a fit is needed at the inside as well as at the outside of the stud. If the motor housing (7) is made from deep drawn sheet metal, the double fit is only possible, if, when viewed in the circumferential direction, the cross section of the wall of the stud (6) is formed like a wave. This facilitates the use of a plastic cover (18) in connection with the sheet metal housing (7) and the avoidance of a carbon brush support plate. In connection with a further embodiment, the lack of a support plate facilitates an automatic assembly of the motor (2) as well as the combination with plug connections and electronic housings.

48 Claims, 5 Drawing Sheets

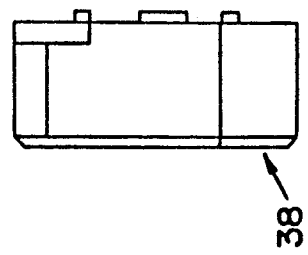
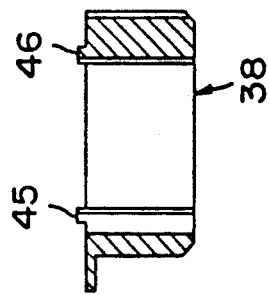
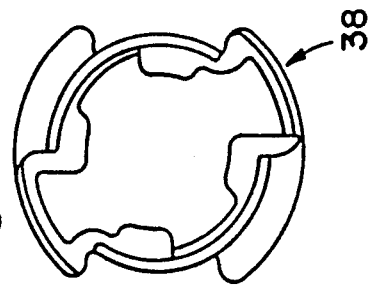
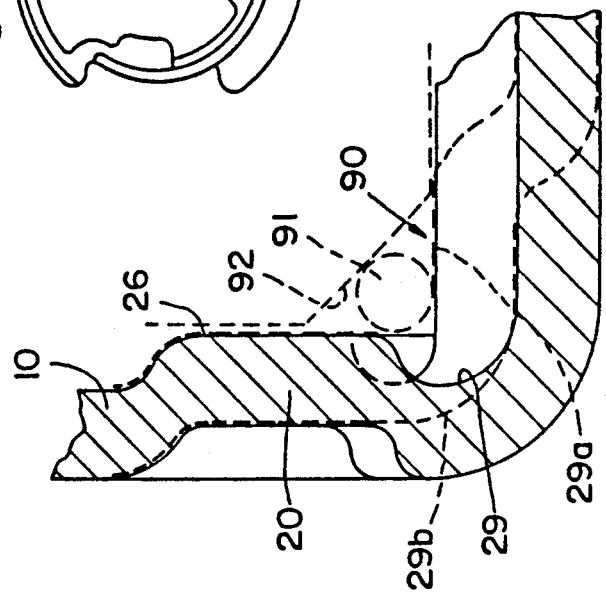
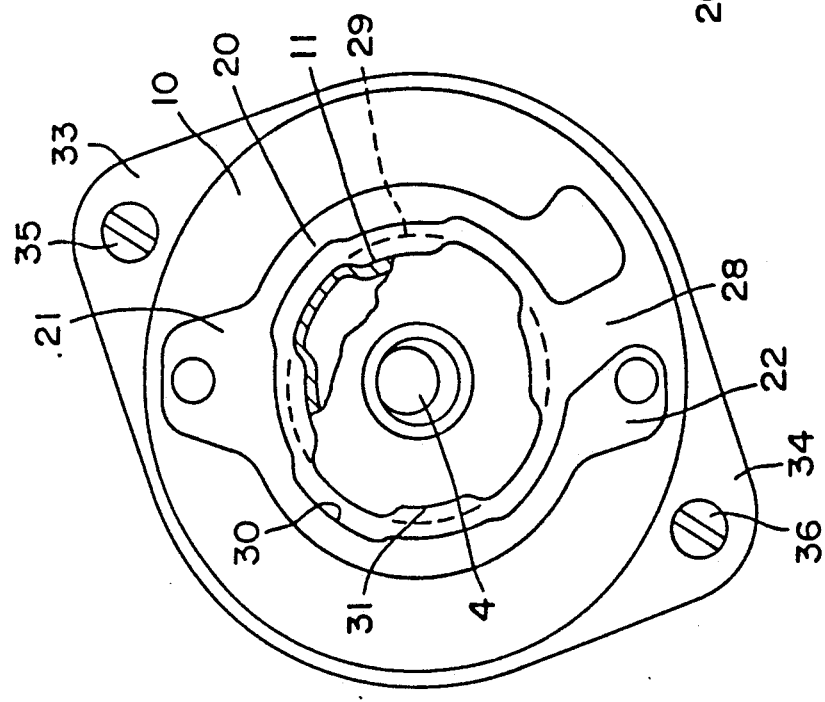

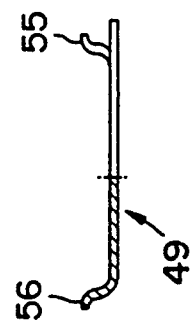
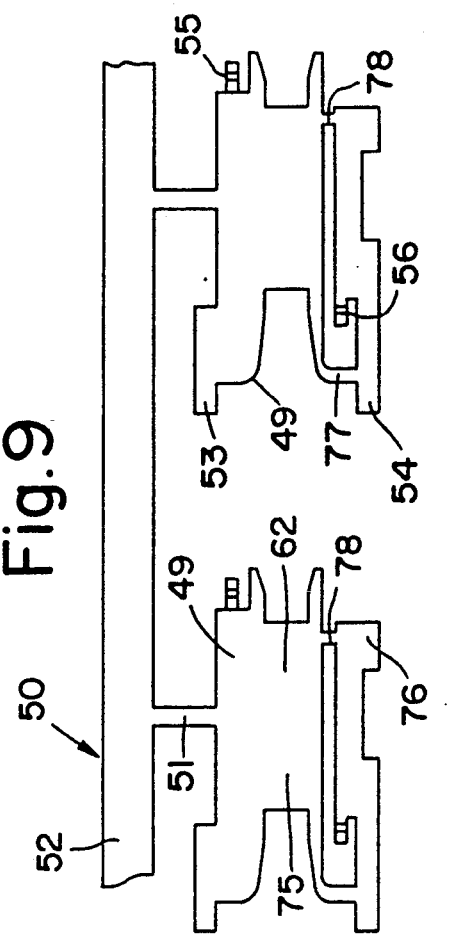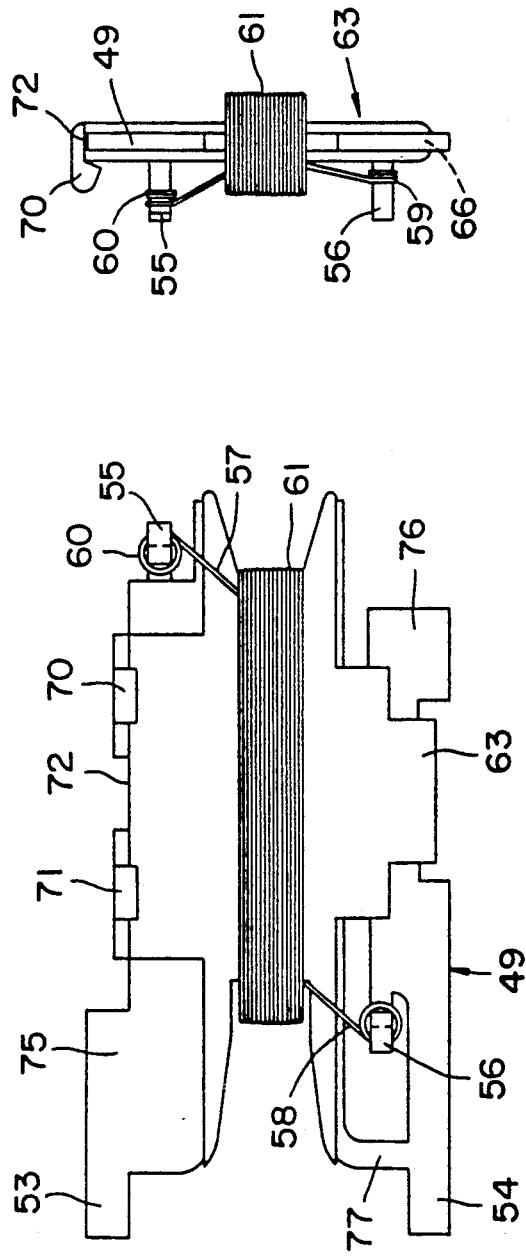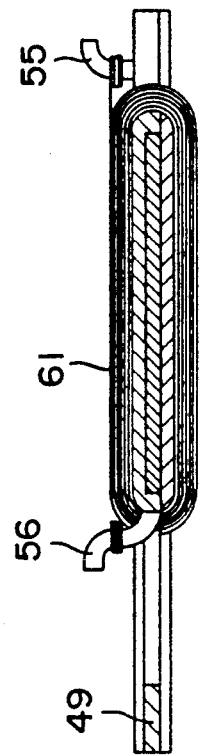

ELECTRIC MOTOR WITH ATTACHED PUMP

BACKGROUND OF THE INVENTION

The present invention relates to an electric motor connected with a pump. The housing of the pump has a cylindrical insertion recess which receives a tappet-shaped stud of the motor housing. The stud encloses the first bearing of the motor armature free from play. The recess is situated at the side of the pump and provides an aperture for the armature shaft.

Units including a pump and an electric motor are known. A specific field of use for such units is in the brake system of a motor vehicle and, especially, in the anti-locking-system for the brakes of a motor vehicle. Typically, the pump is a radial piston liquid pump which is driven by an eccentric on the driven shaft of an electric motor. According to the prior art, a motor housing made from sheet metal is used. The motor housing is equipped with an aluminium flange which receives the bearing and has to be treated accordingly. In addition, a separate carbon brush support plate is necessary.

SUMMARY OF THE INVENTION

The object of the present invention is to provide a motor housing in which a form-fitting connection to the pump, and to the assembly of the bearing situated at the side of the pump free from play, is achieved without additional treatment of the housing. This object is achieved according to the present invention by providing, in a conventional unit including an electric motor and a pump driven by the electric motor, a particular structural relationship between the housing of the motor and the cover closing it. The bottom of the pot-shaped housing is provided with a bulge, which forms the stud receiving the first bearing and which can form-fittingly be inserted into the recess of the pump housing.

The present invention renders it possible to form a motor housing with a tappet-shaped stud as a deep drawn member. The tappet-shaped stud facilitates a form-fitting centering, without additional treatment, both outside and inside the stud. The first bearing, situated at the side of the pump, can be pressed into the inside of the tappet-shaped stud. In addition, to connect the motor with the pump, the tappet-shaped stud is form-fitted to the recess of the pump housing. The cross section of the wall in the section of the motor housing which forms the tappet-shaped stud is selected to provide the elasticity and stability which is necessary for the outer and inner centering and the safe connection as well as to fix the first bearing and the pump.

In order to ensure support of the pump housing at the motor housing outside of the tappet-shaped stud, the present invention provides, at the bottom of the pot of the housing, a ring-shaped bead concentrically surrounding the stud. The bead has integral fixing eyes arranged approximately diametrically opposite each other and the whole embossed part forms a flat flange plane for the pump housing. The pump housing is situated directly on the flange plane, which is perpendicular to the longitudinal axis of the armature. Pressure nuts are placed into the fixing eyes when assembling the motor and the pump. It is also possible to put screw threads directly in the motor housing.

The outer surface of the bottom of the pot may be recessed slightly with respect to the flange surface. A groove in the bottom of the pot makes the use of a relatively big radius possible at the transition from the bottom of the pot to the stud. The groove forms a circumferential channel, together with the part of the motor housing turned towards the pump housing and the flat flange surface, which, if necessary, can remove leakage liquid.

In a preferred embodiment of the invention, a runoff for leakage fluid is provided. During operation, the leakage fluid runs down through the space between the ends of the C-shaped legs of the ring-shaped bead. The ends of the C-shaped legs point down and the bottom of the groove and the bottom of the drain channel are preferably situated in the same vertical plane.

The configuration of the tappet-shaped stud is advantageous in facilitating removal of leakage fluid because it creates axial channels in which the liquid can flow. Thus, an impenetrable connection of this stud with the recess of the pump is avoided. In case the pump is leaky, the overflowing hydraulic oil can flow through the channels. The channels are formed by the flutes of the wave-like circumference of the stud and the recess of the pump housing and are in connection with the circumferential groove of the pump housing. A further advantage is that the bottom of the pot of the motor housing is integrally made with the cover of the motor housing and the stud, so that there are no sealing problems in this area. If impermeability is especially required, the stud is preferably round in the first third of its length, adjacent to the bottom of the pot, so that a seal can be put around the stud in this area.

If the second bearing of the motor is formed like a ball, the first recess in the cover has a corresponding shape where it surrounds the bearing. The pipe-shaped second recess of the cover is preferably closed to the outside.

A support ring is situated between the second bearing and the commutator of the armature. The support ring may have an axially protruding edge facing the commutator on which the commutator can be put during assembly. Because it closes the inner mouths of the radial channels of the cover, if the cover is loose, the support ring retains the carbon brushes which are under spring pressure in the radial channels. The support ring is moved to the side during the assembly of the motor and the commutator moves in front of the inner mouths of the radial channels. Thus, the carbon brushes abut against the commutator once released by the support ring.

Therefore, the support ring is ideal for an automatic blind assembly of this motor. The support ring preferably protrudes slightly, when viewed in a radial direction, at least in the area of the inner mouths of the channels, so that the commutator has a smaller distance from those inner mouths after the assembly. The carbon brushes can, depending upon the size of this space, be moved radially after being released by the support ring, until they meet the commutator. This structural relationship and the fact that the cover is preferably made from heat-resistant plastic (and, therefore, all necessary additional components can be attached), renders unnecessary a separate brush support plate. This and the easier assembly lead to simplification and cheaper manufacture of this motor.

In another embodiment of the present invention, the support ring forms an axial support member for the armature at the side of the commutator in the end position of the shift. The support ring is held in its end position of the shift by a press fit in the second recess of the cover. An armature, mounted in the motor pot by a bearing bush, can support itself either directly or indirectly by putting a ring or the like in between the armature and the pot.

A sensor is helpful to monitor use of the motor and pump. If the cover is plastic, it is possible to form a rail-like stud integrally onto the cover. The sensor is mounted on the stud and no additional assembly work is needed.

The sensor has a coil body punched out of a flat metal sheet member. The flat metal sheet member is provided with two integrally made first connecting tabs for attaching the sensor and two second connecting tabs for the electrical connection with the two coil ends. This formation of the coil body makes a series production possible, by punching the coil bodies out of a metal blank using the cycle method. As far as changes in shape are necessary, it is possible to make them immediately or in the same cycle method or with a following tool.

The coil cannot be fixed directly to the metal member. Rather, the section of the punched metal sheet member, which receives the coil, is equipped with a plastic coating from which the first and second connecting tabs are omitted. This coating is fitted to the sheet-metal member in such a way that the wire cannot be damaged when winding the coil and that an electric contact with the coil body is reliably precluded. There is only an electric connection at the second connecting tabs, one of which is electrically connected with one wire end of the coil and the other with the other end of the coil. Those connections can be secured by solder, for example.

It is possible to use an injection molded plastic for the plastic coating. The plastic is folded around the area of the coil body which has to be electrically insulated. The plastic member is easily folded and fixed on the coil body, because it is formed as two substantially identical halves with a connecting web. Folding the plastic member is especially easy if the thickness of the wall between the two folding axes is smaller than the thickness of the remainder of the wall and the component is shortened in the area of the folding axes (when viewed in the longitudinal direction).

One half of the plastic member is provided with a spaced edge at least in the area of the winding. The height of the spaced edge approximately corresponds to the thickness of the metal sheet of the coil body. Thus electrical security is increased. Each half of the plastic member is H-shaped, whereby the web of the "H" receives the coil. This shape facilitates the manufacture of the coil.

If the coil body is a single sheet metal member, at which both connections for the sensor and also both connections for the two coil ends are fixed, the sensor and coil end connections must be electrically separated. The metal member is formed of two differently sized pieces connected by two webs. The two webs, which cause the mechanical connection of the two pieces of the metal member, are separately removed during manufacture. The first web is punched out after the plastic coating is applied to the coil body; the second web is removed after an insulating coating is applied.

The sensor can be connected with an external monitor by providing a plug or the like, integrally formed in the cover. The connecting tabs of the sensor can also be used directly as plug contacts.

BRIEF DESCRIPTION OF THE DRAWINGS

The invention is described more clearly by way of the drawings, in which:

FIG. 4 is a side view of the right end of the motor, FIG. 5 is a detailed view of the motor housing in the area of the tappet-shaped stud illustrated on a highly enlarged scale, FIG. 6 is a longitudinal section of the support ring of the motor, FIG. 7 is a front view of the support ring, FIG. 8 is a lateral view of the support ring, FIG. 9 is a top view of a sheet metal blank with two punched coil bodies arranged one behind the other, FIG. 10 is a partial section taken in the longitudinal direction of the coil body, FIG. 11 is a top view of the coil body with the plastic coating and coil, FIG. 12 is a lateral view of FIG. 11 in the longitudinal direction, FIG. 13 is a view of FIG. 11 in cross direction.

DETAILED DESCRIPTION OF THE INVENTION

Figure 1:
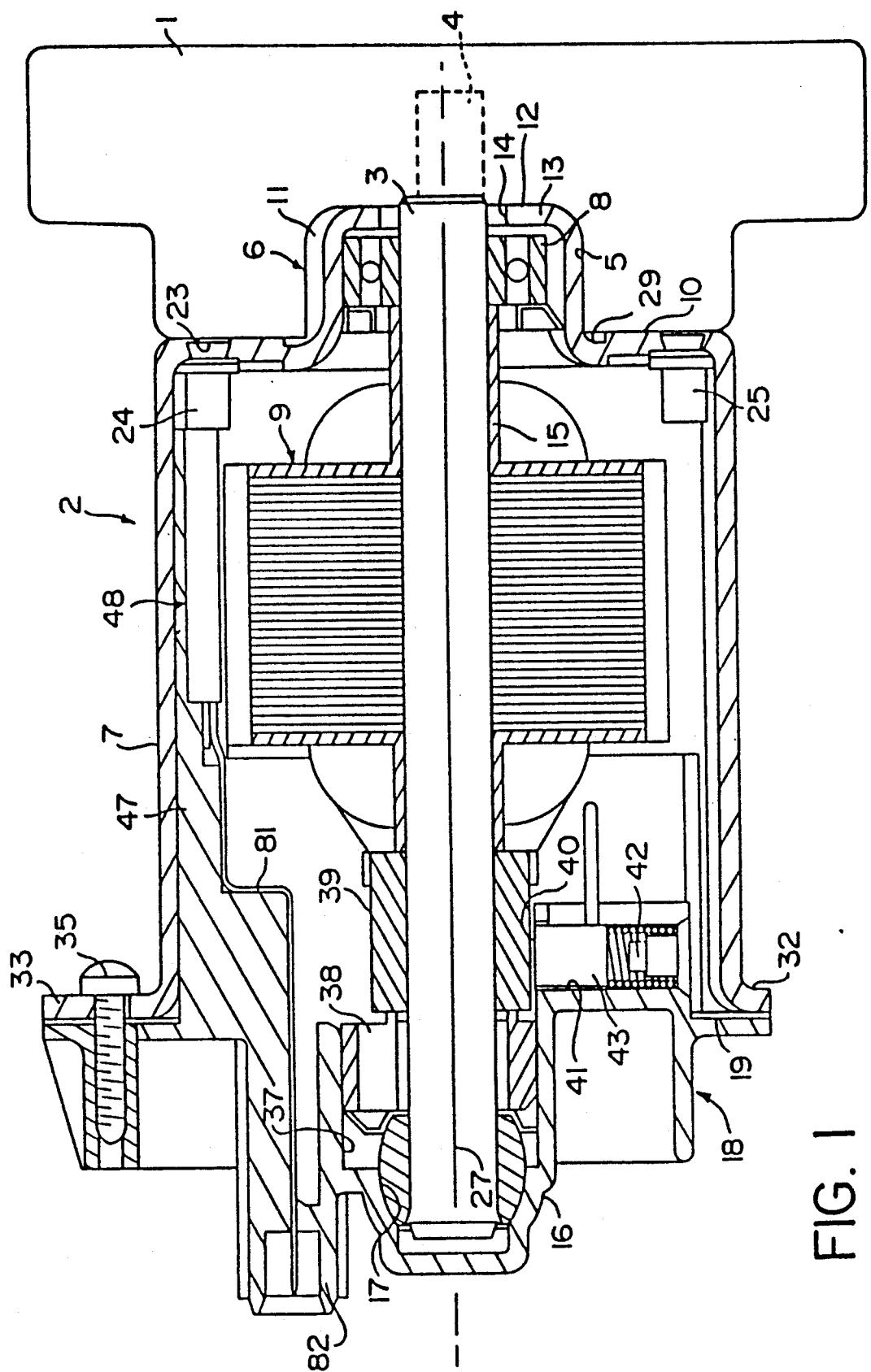
FIG. 1 is a longitudinal section of the motor with a pump schematically indicated.
Figure 3:
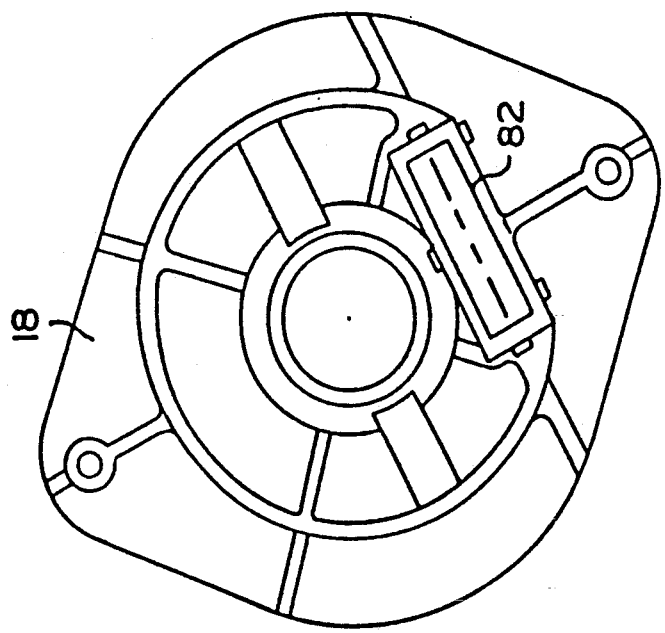
FIG. 3 is a side view of the left end of the motor of FIG. 2.

As shown in FIG. 1, the electric motor 2 is form-fittingly connected with the pump 1 via a plug connection. The eccentric tappet 4, which is fixed and formed on the free end of the driven shaft 3, can engage the pump, which is preferably formed as a radial piston pump, as required. The pump 1 has a conventional insertion recess 5 to receive a hollow tappet-shaped stud 6 of the motor housing 7. The first bearing 8 of the motor armature 9 is inside of this stud 6.

To ensure simultaneously an inner fitting for the first bearing 8 and an outer fitting for the tappet-shaped stud 6 in the insertion recess 5, the tappet-shaped stud 6 is formed in a specific way. This makes it possible to manufacture the motor housing 7 together with the tappet-shaped stud 6 as a single deep drawn member.

Figure 2:
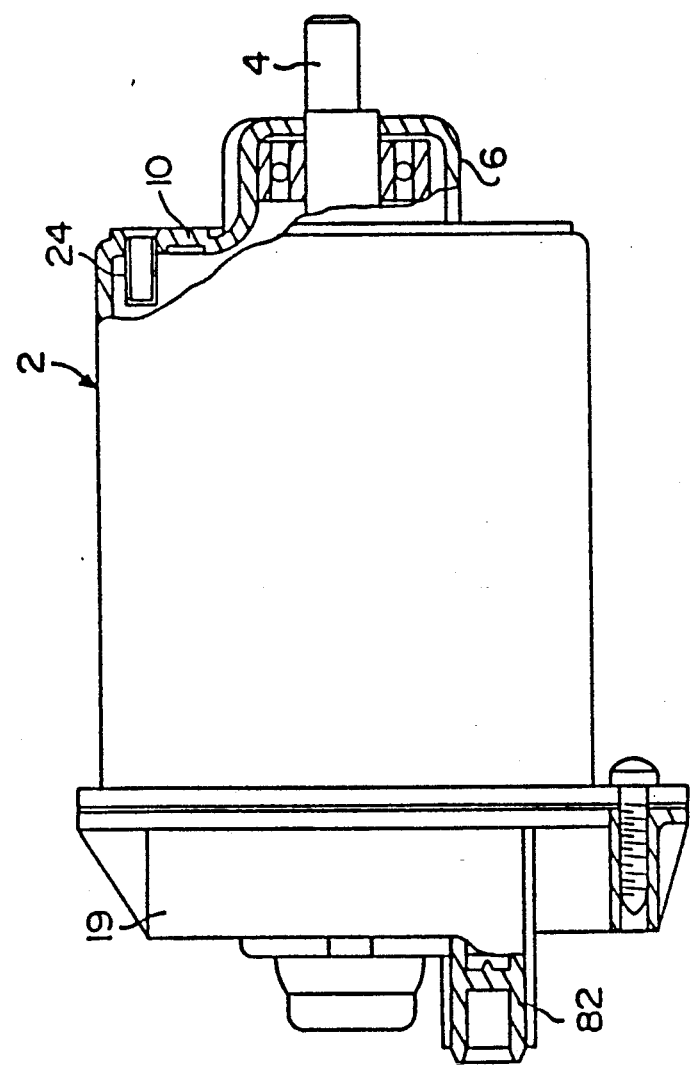
FIG. 2 is the lateral view and partial longitudinal section of the motor on a reduced scale.
Figure 17:
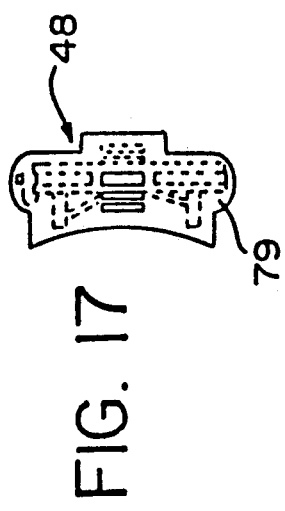
FIG. 17 is a lateral view of the sensor.

As is evident from FIG. 1 or 2 viewed in connection with FIG. 4, the cross section of the wall of the hollow, tappet-shaped stud 6, which protrudes beyond the bottom of the pot 10 in the axial direction, is made wave-like or is provided with longitudinal flutes 11. This shape of the stud 6 ensures (1) a tight and form-fitting connection between pump 1 and electric motor 2, and (2) a concentric, form-fitting assembly of the first bearing 8, which can withstand the consequent strain, in the inside of the hollow, tappet-shaped stud 6.

A disc 13 may be placed between the first bearing 8, which is formed as a rolling bearing, and the bottom 12 of the pot-shaped stud 6. A penetration bore 14 is provided in stud 6 for the driven shaft 3. The axial fixation of driven shaft 3 is provided on the other side of first bearing 8 by a pipe-shaped stud 15 of the motor armature 9. Furthermore, the second bearing 16 for the armature 9 or the driven shaft 3 of the motor 2 is situated in a first recess 17 of the cover 18. Cover 18 closes the pot opening 19 of the motor housing 7 which faces away from the pump 1.

Especially evident from FIG. 4 or 5, at the bottom of the pot 10 of the motor housing 7 there is a ring-shaped bead 20 approximately concentrically surrounding the stud 6 and protruding towards the outside. Bead 20 has integral fixing eyes 21 and 22 arranged approximately diametrically opposite each other. The surface of the pump 1 turned towards the bottom of the pot 10 meets this bead 20 directly. Conventional press nuts 24 and 25 are inserted into the respective bore of each fixing eye 21 and 22. The connection with the pump is made with the screws 23 in a known manner.

The plane surface of the bead 20, which extends vertically to the longitudinal axis 27 of the driven shaft 3, forms a flange surface 26. Bead 20, an embossed part, is essentially C-shaped (FIG. 4), whereby the space between the two C-leg ends forms a drain channel 28. In operational position, bead 20 is funnelled to the lower section of a groove 29 in the bottom of the pot 10 so that any leakage oil which might be in the groove 29 can completely flow off through the drain channel 28. The groove 29 is limited by the ring-shaped bead 20 at the outside and by the stud 6 at the inside, whereby the bottom of the groove 29 as well as the bottom of the drain channel 28 are situated in the plane of the outer surface of the bottom of the pot 10. FIG. 4 shows that the inner circumferential line 30 of the embossed part or bead 20 approximately corresponds to the outer circumferential line 31 of the tappet-shaped stud 6 in the area of the bottom of the pot 10 and, therefore, the groove 29 has a corresponding shape when viewed in the circumferential direction.

FIGS. 4 and 5 show, in broken lines 29a, 29b, that the stud 6 can form a cylindrical section 90 which is adjacent to the bottom of the pot 10. The outer diameter of stud 6 corresponds to the outer diameter in the areas outside of the longitudinal flutes 11. A conventional O-ring 91 may be placed in the cylindrical section 90, around the stud 6, so that the O-ring 91 is squeezed between the motor housing 7 and a chamfer 92 of the pump. In this way the pump 1 is sealed towards the outside in the area of the stud 6.

The edge 32 of the pot 10 is bent to the outside, as shown in FIG. 1, to form a contact area for the cover 18. Two eyes 33 and 34 are formed in the edge 32 and make it possible to connect the motor housing 7 with the cover 18 by screws 35 and 36.

As already explained, the cover 18 has a first recess 17 for the second bearing 16. Recess 17 is situated at the inner end of the second pipe-like recess 37, provided for a support ring 38, and joins it in the axial direction. The support ring 38 is shown in detail in FIGS. 6 to 8 and, more generally, in FIG. 1. In FIG. 1, the assembly end position of the support ring 38 is illustrated. Support ring 38 is arranged between the second bearing 16 for the armature shaft 3 and the commutator 39 of the armature shaft 3.

In the initial position, not shown in the drawings, taken by the support ring 38 when the cover is loose, the support ring 38 covers the inner mouth 40 of two radial channels 41. Radial channels 41 are displaced in the circumferential direction (only one of the radial channels 41 can be seen in FIG. 1). Thus, support ring 38 holds down the carbon brush 43 which is under the effect of a load spring 42 in each radial channel 41. Since the commutator 39 is fixed without rotation or translation on the shaft 3 of the armature 9, the end of the support ring 38 engages the front of the commutator 39 through its support members 45 and 46.

At this point in time the support ring 38 is spaced axially from the second bearing 16. The more the cover 18 approaches the housing 7 of the motor 2, the more the support ring 38 is pushed into the second recess 37 and the more the left end of the armature shaft 3 (illustrated in FIG. 1) enters the second bearing 16. Since the commutator 39 always touches the support ring 38 during this shifting movement, the commutator 39 overlaps each inner mouth 40 of each radial channel 41 to that extent to which each inner mouth 40 is left uncovered by the support ring 38. The carbon brush 43 cannot make an uncontrolled movement in its radial channel 41. Rather, when completely released by the support ring 38, the carbon brush 43 will contact the commutator 39 after penetrating the small space between the inner mouth 40 and the commutator 39.

In the end position of the shift, the support ring 38 is held without play in the second recess 37. The support ring 38 also forms a support for the armature 9 by engaging the front face of the commutator 39. The armature 9 is mounted in the motor housing 7, free from play, via a calotte cap or cylindrical bearing in the motor housing.

When the unit consisting of the pump 1 and the electric motor 2 is used in a vehicle brake system, the function of the electric motor must be monitored. For this purpose, a sensor 48 is provided. Sensor 48 is situated at a rail-like stud 47 of the cover 18. If the cover 18 is made from plastic, as is preferable, the rail-like stud 47 can be molded as part of the cover 18. According to FIG. 1, the sensor 48 interfaces with the armature 9 of the electric motor 2. The different elements of the sensor 48 are illustrated in FIGS. 9 to 17. Discussed indirectly below are the different steps for manufacturing this sensor 48.

The sensor 48 has a coil body 49, which is punched out of a sheet metal band 50 (see FIG. 9). As shown in FIG. 9, the different coil bodies 49 are connected to the remainder 52 of the sheet metal band 50 by a web 51.

This web 51 is later removed. Two first connecting tabs 53 and 54 for the sensor 48 and two second connecting tabs 55 and 56 for the electric connection of the two coil ends 57 and 58 are formed directly onto the coil body 49. Whereas the first connecting tabs 53 and 54 remain in the plane of the metal sheet band 50, the second connecting tabs 55 and 56 are bent twice in opposite directions (FIG. 10). Thus, the coil ends 57 and 58 can be fixed in several windings 59 or 60 at their second connecting tabs 55 and 56 without problem. This connection is secured by means of solder or the like.

Figure 15:
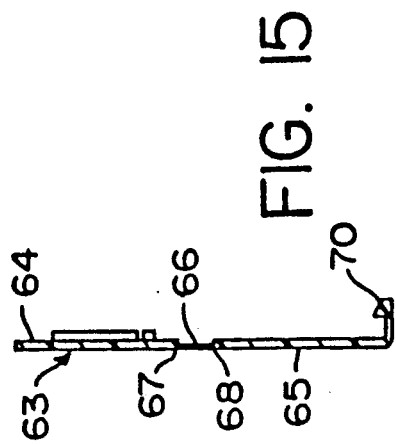
FIG. 15 is a lateral view of FIG. 14.
Figure 14:
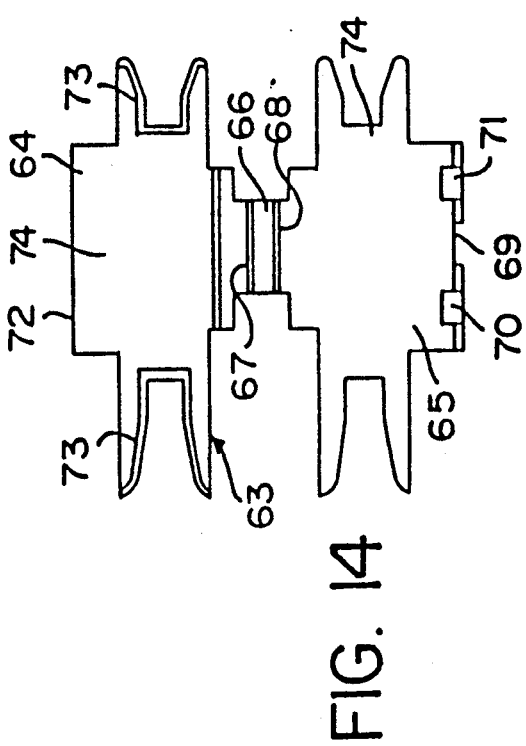
FIG. 14 is a top view of the plastic coating which is spread out in a plane.

The area 62 of the coil body 49 which takes up the coil 61 is surrounded by a plastic coating, the exact shape of which is shown in FIGS. 14 and 15. The exact shape of the coil body 49 is shown in FIGS. 9 and 10. Especially from FIG. 13, but also from FIGS. 11 and 12, it can be seen how the plastic coating 63 surrounds the coil body 49 in its area 62. It can also be seen that this coating 63 covers neither the first connecting tabs 53 and 54 nor the second connecting tabs 55 and 56.

The plastic coating 63 consists of two halves 64 and 65 which are more or less the same, but which differ slightly in detail, as explained below. They are connected via an intermediate web 66. The connection of the web 66 with each of the plastic coating halves 64 and 65 produces folding axes 67 and 68. The distance between the two folding axes 67 and 68 corresponds approximately to the thickness of the sheet metal band 50 of the coil body 49.

Two hook-like locking members 70 and 71 are formed onto a first longitudinal edge 69 which runs parallel to the folding axes 67 and 68. When the plastic coating 63 is assembled onto the coil body 49, each of these hook-like locking members 70 and 71 overlaps a second longitudinal edge 72, which runs parallel to the first longitudinal edge 69. The half 64 of the plastic member 63 is, at least in the area of the winding of the coil 61, provided with a spaced edge 73 which corresponds to the circumference of the plastic member 63 in this area. The height of the spaced edge 73 corresponds to the thickness of the sheet metal band 50 of the coil body 49. Furthermore, as shown in FIG. 14, each half 64 and 65 of the plastic member 63 is H-shaped. The web 74 of each H-shaped half 64 and 65, respectively, receives the coil 61.

As illustrated in FIG. 9, the punched coil body 49 consists of two dissimilar (at least in size) pieces 75 and 76. FIG. 11 shows that the one of the two webs, namely web 78, is removed after the plastic coating 63 has been fixed on the coil 61. Thus a mechanical, but also an electrical, connection between the two pieces 75 and 76 is provided only via the web 77.

Figure 16:
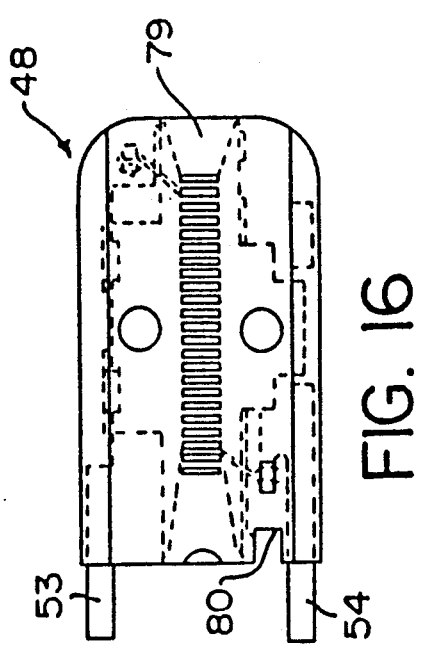
FIG. 16 is a top view of the finished sensor.

The unit, shown in FIG. 11, consisting of the coil body 49, its insulating plastic coating 63, and the coil 61 fixed thereon, is surrounded by a plastic insulating coating 79 in an additional manufacturing step. According to FIG. 16, only the first two connecting tabs 53 and 54 project beyond this coating 79. By tabs 53 and 54, the sensor 48 can be connected to a source of electricity. After applying the coating 79, there is enough stability so that web 77, between the two pieces 75 and 76 of the coil body 49, can be removed. FIG. 16 shows a punched out area 80. Connecting tabs 53 and 54 are each connected with a connecting line or wire 81 which leads to a plug 82 of the cover 18. This plug 82 also can be integrally formed with the cover 18.

In a manner not shown in these drawings, an electronic box or the like can be integrated into the cover 18 without any problem due to the materials used and to the method of manufacture. When injection-molding the coating 79, the web 77 has to be punched out and, therefore, the coating 79 has to be made thinner at this point or a respective recess in the coating 79 has to be provided.

What is claimed is:

1. An electric motor connected with a pump, whereby the housing of the pump comprises a cylindrical insertion recess for a tappet-shaped stud of the motor housing which engages therein and whereby this stud additionally receives the first bearing, free from play, of the motor armature at the side of the pump and has an aperture for the armature and the motor driven shaft, wherein the housing of the motor is formed as a pot-shaped member deep drawn from a metal blank, the opening of the pot, facing away from the pump of said drawn member, is closed by a cover receiving the second bearing of the motor armature, and wherein, seen in the circumferential direction, the cross section of the wall of the stud, which protrudes from the bottom of the pot axially, is formed wave-like and has longitudinal flutes and which form fittingly engages into the insertion recess of the pump.

2. An electric motor connected with a pump according to claim 1, wherein the stud is round at the outside in a section adjacent to the bottom of the pot.

3. An electric motor connected with a pump according to claim 1, wherein at the bottom of the pot of the housing there is a ring-shaped bead concentrically surrounding the stud and protruding towards the outside, which bead comprises integral fixing eyes arranged approximately diametrically opposite each other, whereby the whole embossed part forms a flat flange surface for the pump housing.

4. An electric motor connected with a pump according to claim 3, wherein from the flange surface axially protrudes a groove of the bottom of the pot, which groove is limited by the ring-shaped bead at the outside and by a stud at the inside, whereby the bottom of the groove is preferably situated in the plane of the outer surface of the bottom of the pot.

5. An electric motor connected with a pump according to claim 4, wherein the inner line of the circumference of the bead corresponds approximately to the outer line of the circumference of the tappet-shaped stud and that both lines of circumference show an approximately constant distance in the plane of the flange surface.

6. An electric motor connected with a pump according to claim 4, wherein the bead with the flange surface is formed in the way of a slitted ring and therefore substantially shows a C-shaped form, whereby space between the end of the C-legs forms a drain channel and is directed to the lower end, during operation position.

7. An electric motor connected with a pump according to claim 1, wherein the edge of the bottom of the pot is bent towards the outside and forms a support area for the cover.

8. An electric motor connected with a pump according to claim 1 wherein the cover comprises a first recess for the second bearing, which recess is situated at the end turned away from the armature of a pipe-like recess for a shift support ring which is penetrated by the armature shaft, whereby the support ring shows a lateral distance of the second bearing, before the assembly of the cover wherein the support ring retains carbon brushes in the shift home position held on the cover for the electric connection with the commutator of the armature in an assembly position and is shifted by the commutator during the assembly of the cover for releasing the carbon brushes.

9. An electric motor connected with a pump according to claim 8, wherein the support ring forms a support member at the side of the commutator for the second bearing in the shift end position and whereby the support ring is held in the shift end position by a press fit in the second recess of the cover.

10. An electric motor connected with a pump according to claim 1 wherein there is a rail-like stud at the cover, which stud engages in the space between the armature and the wall of the pot, and at which stud a recess or a similar fixing facility for a sensor controlling the motor is situated.

11. An electric motor connected with a pump according to claim 10, wherein the rail-like stud is integrally made from plastic with the cover.

12. An electric motor connected with a pump according to claim 10 wherein the sensor comprises a coil body made from a flat punched out metal sheet, which coil body is provided with two integrally made first connecting tabs for the sensor and with two second connection tabs for connecting with the two coil ends.

13. An electric motor connected with a pump according to claim 12, wherein the second connecting tabs of the coil body for forming fixing hooks are bent twice in opposite directions, whereby the free hook ends are directed towards the outside and to opposite directions.

14. An electric motor connected with a pump according to claim 12, wherein the section of the punched out coil receiving the coil is supplied with a plastic coating which leaves out the first and second connecting tabs.

15. An electric motor connected with a pump according to claim 14, wherein the plastic coating consists of a plastic part, which can be folded and is fitted to the shape of the punched coil body in the section of the coil and which is, if unfolded, substantially flat, and whereby a first longitudinal edge, preferably parallel to the folding axes, carries two locking members which when folded, lock with a second longitudinal edge running parallel to the first longitudinal edge at the opposite end.

16. An electric motor connected with a pump according to claim 15, wherein the plastic coating consists of two substantially identical halves, which are connected by an intermediate web, whereby each connection of the intermediate web with its respective half forms a folding axis and whereby the distance between the two folding axes approximately corresponds to the thickness of the metal-sheet of the coil body.

17. An electric motor connected with a pump according to claim 16, wherein one half of the plastic coating is provided with a spaced edge at least in the section of the winding of the coil, the height of which spaced edge approximately corresponds to the thickness of the metal-sheet of the coil body.

18. An electric motor connected with a pump according to claim 16, wherein each half of the plastic coating is approximately H-shaped, whereby the H-web receives the coil.

19. An electric motor connected with a pump according to claim 14 wherein the punched coil body consists of two pieces, especially different in size, connected with each other by two webs, each of which pieces comprises a first and a second connecting plug.

20. An electric motor connected with a pump according to claim 19, wherein one of the webs between the two pieces of the coil body is removed after fixing the plastic coating on the coil.

21. An electric motor connected with a pump according to claim 20, wherein the coated coil body is surrounded by an insulating coating, leaving out the first connecting tabs.

22. An electric motor connected with a pump according to claim 21, wherein the second web between the two pieces of the coil body is removed after fixing the coating.

23. An electric motor connected with a pump according to claim 22, wherein the first connecting tabs of the coil body are connected with a connecting wire each leading to a plug, and these connecting wires run essentially along the rail-like stud of the cover and wherein the plug is situated at the cover.

24. An electric motor connected with a pump according to claim 22, wherein the first connecting tabs of the coil body directly serve as outer terminals.

25. An electric motor and pump unit comprising:
an electric motor having:
(a) an armature including a first bearing, a second bearing, and a driven shaft,
(b) a housing shaped as a pot with a bottom and a tappet-shaped stud protruding from said bottom, said stud enclosing said first bearing without play and having longitudinal flutes and an aperture receiving said driven shaft, and
(c) a cover closing an opening in said housing and having a first recess adapted to receive said second bearing; and
a pump having a housing including a cylindrical insertion recess located at the side of said pump and adapted to form-fittingly receive said tappet-shaped stud of said motor housing.

26. The electric motor and pump unit as claimed in claim 25 wherein said stud has a cylindrical section formed adjacent said bottom of said pot-shaped housing.

27. The electric motor and pump unit as claimed in claim 25 wherein said bottom of said pot-shaped housing has a ring-shaped bead concentrically surrounding said stud, said bead having a pair of integral fixing eyes disposed approximately diametrically opposite each other and forming a flat flange surface adapted to engage said pump housing.

28. The electric motor and pump unit as claimed in claim 27 wherein said bottom of said pot-shaped housing has a groove limited by said bead at its outside and by said stud at its inside, the bottom of said groove positioned in the plane formed by the outer surface of said bottom of said pot-shaped housing.

29. The electric motor and pump unit as claimed in claim 28 wherein said bead has an inner circumference which is approximately constant in the plane of said flange surface and said stud has an outer circumference which is approximately constant in the plane of said flange surface, said inner circumference of said bead corresponding approximately to said outer circumference of said stud.

30. The electric motor and pump unit as claimed in claim 28 wherein said bead is substantially C-shaped, having a pair of curved legs and a drain channel formed between said legs, said drain channel directed downward toward said groove when said electric motor and pump unit is operational.

31. The electric motor and pump unit as claimed in claim 25 wherein said bottom of said pot-shaped housing has a bent edge supporting said cover.

32. The electric motor and pump unit as claimed in claim 25 wherein said first recess of said cover is formed at the end farthest from said armature of a pipe-like recess in said cover and said armature has carbon brushes and a commutator adapted for electrical connection therebetween, said electric motor and pump unit further comprising a shift support ring positioned in said pipe-like recess and penetrated by said driven shaft, said support ring spaced from said second bearing and retaining said carbon brushes before said cover is assembled and shifted by said commutator during assembly to release said carbon brushes.

33. The electric motor and pump unit as claimed in claim 32 wherein said support ring is press fit in said pipe-like recess of said cover alongside said commutator and supports said armature when said electric motor and pump unit is fully assembled.

34. The electric motor and pump unit as claimed in claim 25 wherein said cover has a rail-like stud positioned between said armature and said housing of said electric motor, said electric motor and pump unit further comprising a sensor controlling said electric motor and carried by said rail-like stud.

35. The electric motor and pump unit as claimed in claim 34 wherein said cover and said rail-like stud are integrally molded from plastic.

36. The electric motor and pump unit as claimed in claim 34 wherein said sensor has (a) a coil including two coil ends and (b) a coil body including two integral first connecting tabs connecting said sensor and two second connecting tabs connecting said coil ends, said coil body punched out of a sheet metal band.

37. The electric motor and pump unit as claimed in claim 36 wherein said second connecting tabs form fixing hooks having free ends directed in opposite directions.

38. The electric motor and pump unit as claimed in claim 36 wherein said coil body has an area around which said coil is wound, said area receiving a plastic coating omitted from said first and second connecting tabs of said coil body.

39. The electric motor and pump unit as claimed in claim 38 wherein said plastic coating is formed as a substantially flat plastic part adapted to be folded along folding axes to fit said area of said coil body around which said coil is wound, said plastic coating having a second longitudinal edge on one end and a first longitudinal edge on its opposite end substantially parallel to said folding axes and to said second longitudinal edge, said first longitudinal edge having a hook-like locking member adapted to grip said second longitudinal edge when said plastic part is folded.

40. The electric motor and pump unit as claimed in claim 39 wherein said plastic coating has two substantially identical halves connected by an intermediate web, said folding axes formed along the connections between each half and said web and the distance between said folding axes corresponding approximately to the thickness of said sheet metal band out of which said coil body is punched.

41. The electric motor and pump unit as claimed in claim 40 wherein one of said plastic coating halves has a spaced edge with a height corresponding approximately to the thickness of said sheet metal band out of which said coil body is punched.

42. The electric motor and pump unit as claimed in claim 40 wherein each of said plastic coating halves is approximately H-shaped and forms a central web adapted to receive said coil.

43. The electric motor and pump unit as claimed in claim 38 wherein said coil body has two differently sized pieces connected by first and second webs, each of said differently sized pieces including one of said two integral first connecting tabs and one of said two second connecting tabs.

44. The electric motor and pump unit as claimed in claim 43 wherein said first web connecting said two differently sized pieces is adapted to be removed after said coil body receives said plastic coating.

45. The electric motor and pump unit as claimed in claim 44 further comprising an insulating coating surrounding said coil body and omitting said first connecting tabs after said coil body receives said plastic coating and said coil.

46. The electric motor and pump unit as claimed in claim 45 wherein said second web connecting said two differently sized pieces is adapted to be removed after said coil body receives said insulating coating.

47. The electric motor and pump unit as claimed in claim 46 wherein said cover has a plug and each of said first connecting tabs has a wire which runs substantially along said rail-like stud of said cover and connects to said plug, whereby said first connecting tabs are electrically attached to said plug.

48. The electric motor and pump unit as claimed in claim 46 wherein said first connecting tabs form outer electrical terminals for said coil body.

* * * * *